US010136622B2

(12) United States Patent
Reid

(10) Patent No.: US 10,136,622 B2
(45) Date of Patent: Nov. 27, 2018

(54) VORTEX NET CLEANER JETTER ASSEMBLY

(71) Applicant: Darren Reid, Powell River (CA)

(72) Inventor: Darren Reid, Powell River (CA)

( * ) Notice: Subject to any disclaimer, the term of this patent is extended or adjusted under 35 U.S.C. 154(b) by 32 days.

(21) Appl. No.: 15/127,062

(22) PCT Filed: Mar. 18, 2015

(86) PCT No.: PCT/IB2015/001223
§ 371 (c)(1),
(2) Date: Sep. 19, 2016

(87) PCT Pub. No.: WO2015/166347
PCT Pub. Date: Nov. 5, 2015

(65) Prior Publication Data
US 2018/0027785 A1    Feb. 1, 2018

Related U.S. Application Data

(60) Provisional application No. 61/955,597, filed on Mar. 19, 2014.

(51) Int. Cl.
| A01K 75/00 | (2006.01) |
| B08B 3/02  | (2006.01) |
| A01K 61/60 | (2017.01) |
| A01K 63/10 | (2017.01) |

(52) U.S. Cl.
CPC .............. *A01K 75/00* (2013.01); *A01K 61/60* (2017.01); *A01K 63/10* (2017.01); *B08B 3/024* (2013.01); *B08B 2203/0247* (2013.01); *Y02A 40/826* (2018.01)

(58) Field of Classification Search
CPC ........ A01K 75/00; A01K 61/60; A01K 63/10; B08B 3/024
See application file for complete search history.

(56) References Cited

U.S. PATENT DOCUMENTS

| 5,419,493 A * | 5/1995 | Redway | A01M 7/0064 239/172 |
| 5,456,412 A * | 10/1995 | Agee | B08B 3/024 239/104 |
| 8,635,730 B2 | 1/2014 | Heard | |

(Continued)

FOREIGN PATENT DOCUMENTS

| WO | WO20005099917 A2 | 3/2005 |
| WO | WO2016183274 A1 | 5/2016 |

*Primary Examiner* — Spencer E Bell
(74) *Attorney, Agent, or Firm* — Absolute Technology Law Group, LLC

(57) ABSTRACT

The present invention is a jetter assembly for cleaning aquaculture nets in situ. The jetter assembly includes a high-pressure rotational union connected to an outer shroud assembly and an inner washing ring assembly. The rotational union includes a hose inlet connected to a fluid hose, a shaft and a plurality of inner ring segments securing the rotational union to the outer shroud assembly. The outer shroud assembly includes several supporting gussets connecting the outer shroud assembly to the rotational union and several inner and outer shroud sandwich plates connecting several shroud sections. The inner washing ring assembly includes a manifold, several spray bars and a centrifugal vortex plate that generates a fluid vortex to clean the nets.

17 Claims, 9 Drawing Sheets

(56) References Cited

U.S. PATENT DOCUMENTS

2001/0042558 A1\* 11/2001 Rohrbacher ............ A47L 11/03
　　　　　　　　　　　　　　　　　　　　　　134/10
2005/0217708 A1\* 10/2005 Otterson ................ B08B 3/024
　　　　　　　　　　　　　　　　　　　　　　134/34
2010/0307545 A1　12/2010　Osaka et al.

\* cited by examiner

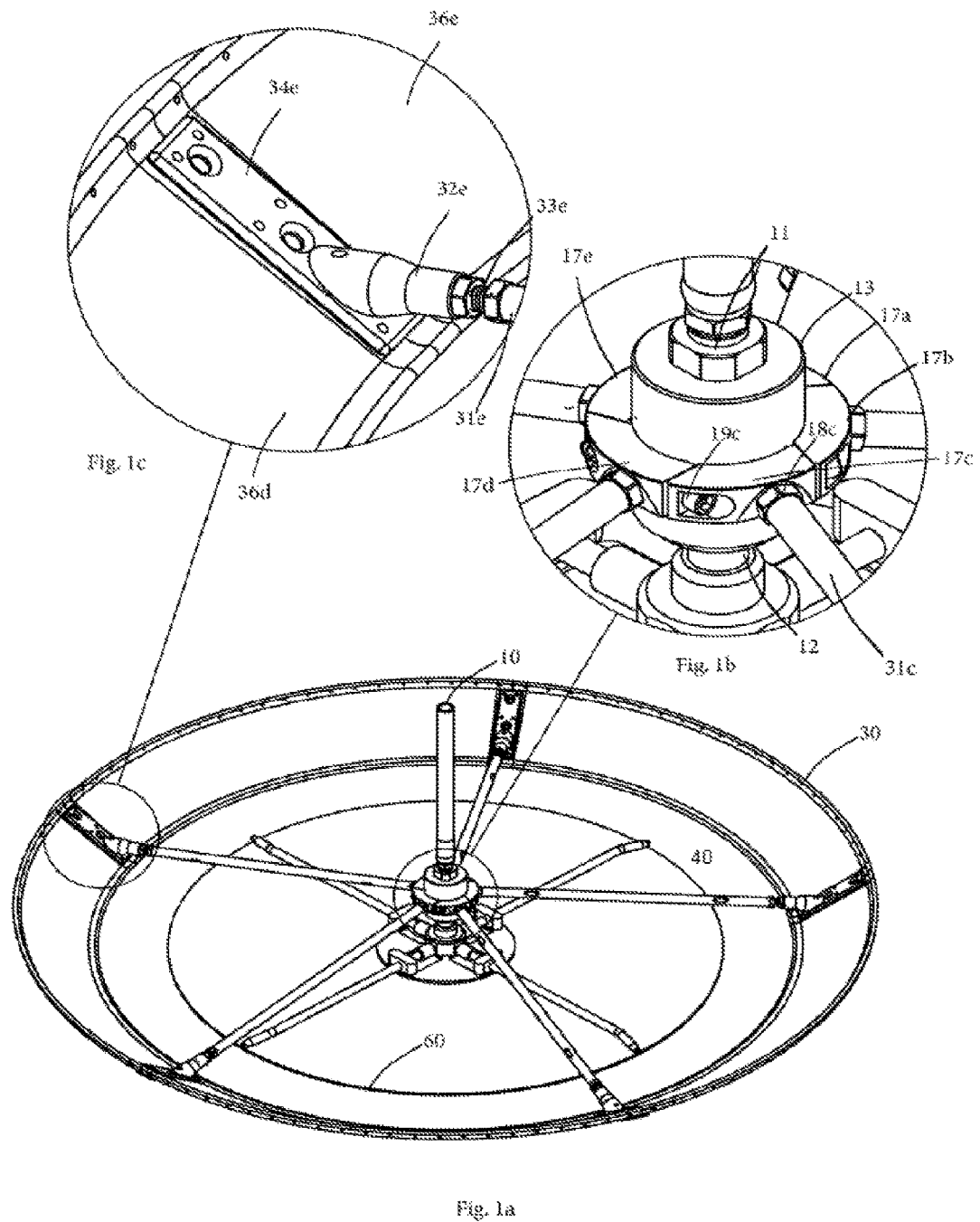

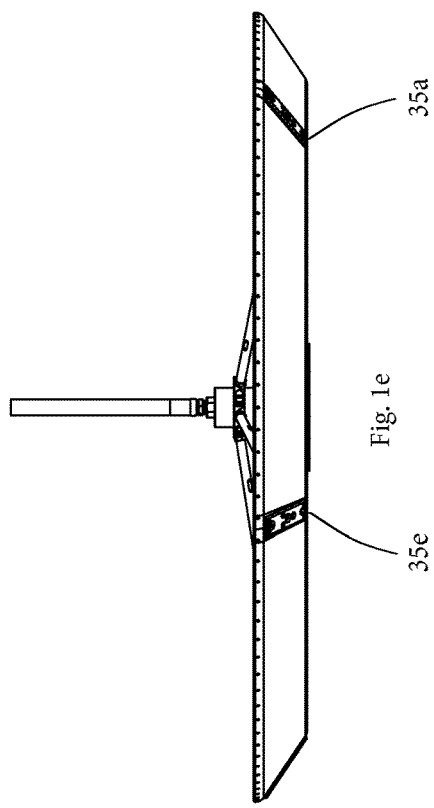
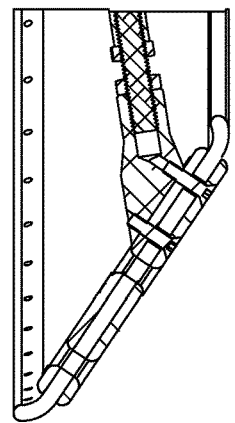
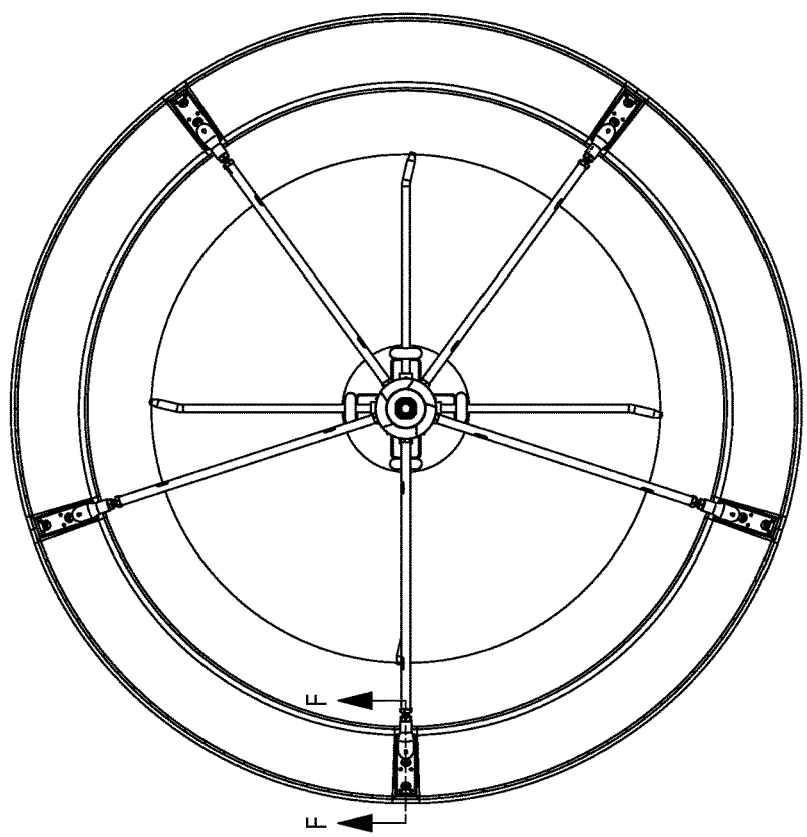

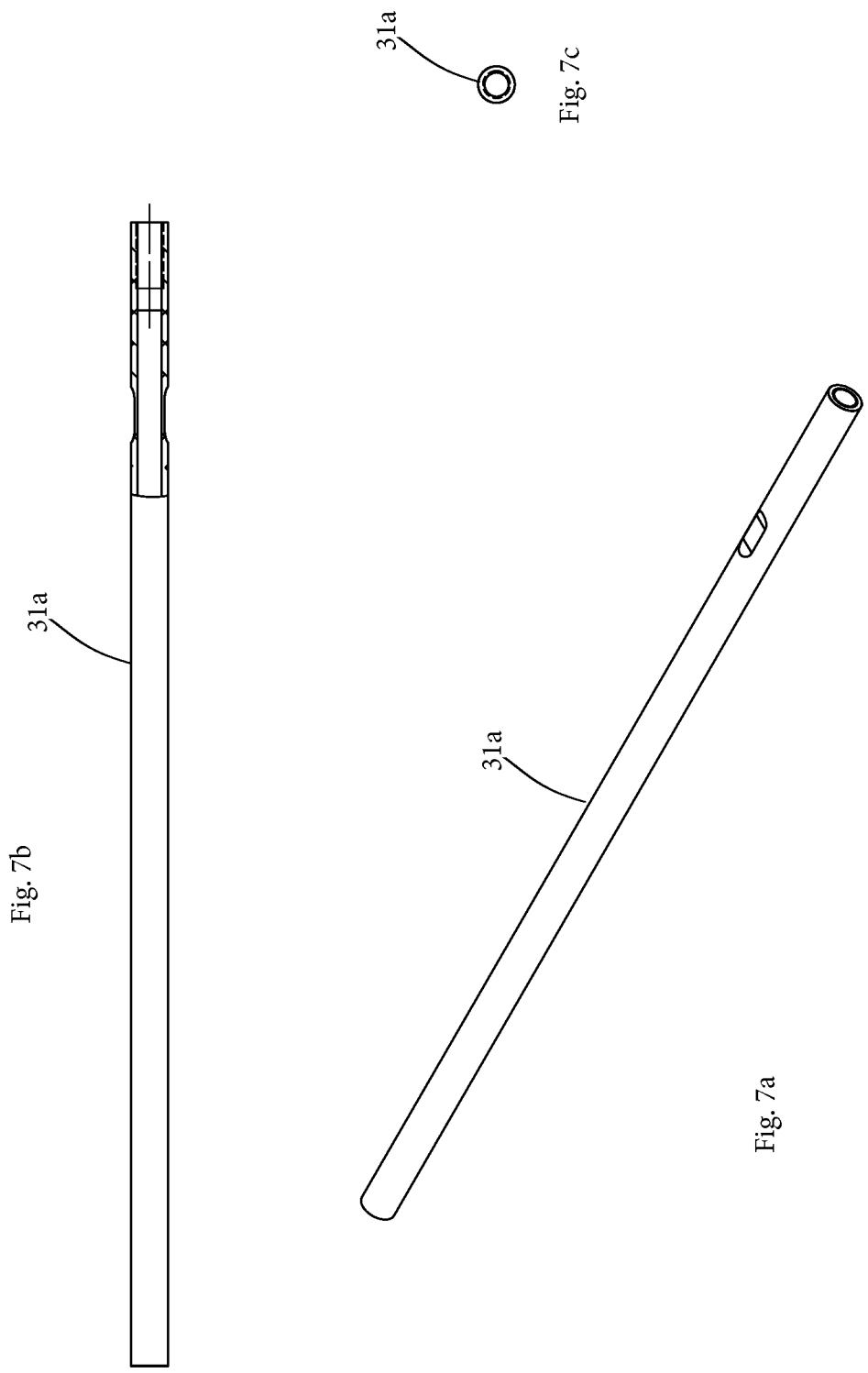

VORTEX NET CLEANER JETTER ASSEMBLY

CROSS-REFERENCE TO RELATED APPLICATIONS

This patent application claims the benefit of U.S. Provisional Application No. 61/955,597 filed Mar. 19, 2014. The above application is incorporated by reference herein in its entirety.

BACKGROUND OF THE INVENTION

1. Field of Invention

This invention relates to the field of aquaculture, and more specifically to a jetter assembly for cleaning aquaculture nets "in situ".

2. Description of Related Art

Net cleaning is vital to ensuring that fish stock in aquaculture remains healthy and edible. Because aquaculture allows husbandry of marine animals in environments controlled, yet still exposed to the sea, the pens and cages in which the animals are raised can be expanded and supplied with food more readily than on-land fisheries or ones located in smaller bodies of water. This allows for controlled production of large quantities of fish without exacerbating the ecological difficulties caused by over-fishing. However, this open environment also requires constant cleaning.

Fishing nets tend to accumulate naturally occurring marine organisms during seasons—notably mussels, bryozoans, and caprillids. As these fouling organisms develop, they restrict life-giving water flow to the penned fish. Left to mature, they harbor harmful bacteria, tax oxygen levels and weigh down attachment points, floatation and anchoring systems. Historically, net cleaning was a reactive measure, foregone until the fouling community had grown enough to become problematic.

Historical net washing procedures involve removing a fouled net and replacing it with a clean one. This process involves substantial equipment, expense, labor and time. Feeding time is often lost and fish experience increased stress due to handling. The fouled net must travel to a land-based facility for washing in huge drums. Once washed, the net must be untangled, feathered out, inspected and repaired of any incidental damage incurred during washing. Drum washing is a significant factor contributing to net degradation.

In an effort to minimize net handling, industry standard practice continues to be coating nets with an active copper compound to delay organic accumulation. This chemical releases ions from the heavy metal, creating a less favorable environment for fouling organisms. While this coating on the net fibers is considered generally effective, its success depends entirely on site specifics and its ionic release capability. The coating is an expensive application. Furthermore, aquaculture experts have reconsidered the coating's use in efforts to maintain the highest standards of environmental sensitivity.

There is an unmet need in the art for a means to rapidly and effectively clean aquaculture nets "in situ", without resorting to damaging drum washers or expensive, potentially toxic chemical compounds.

BRIEF SUMMARY OF THE INVENTION

An exemplary embodiment of a jetter assembly includes a high-pressure rotational union, an outer shroud assembly and an inner washing ring assembly. The high-pressure rotational union includes a hose inlet connected to a fluid hose, a shaft, at least one outer body and a plurality of inner ring segments. The outer shroud assembly includes a plurality of supporting gussets coupled to the plurality of inner ring segments. The plurality of supporting gussets operatively connect to a plurality of inner shroud sandwich plates, a plurality of outer shroud sandwich plates and a plurality of shroud sections. The inner washing ring assembly includes a manifold operatively connected to a plurality of spray bars and a centrifugal vortex plate.

BRIEF DESCRIPTION OF SEVERAL VIEWS OF THE DRAWINGS

FIGS. 1a-1g illustrate perspective, first and second partial enlarged perspective, over, side and first and second partial cross-sectional views of an exemplary embodiment of a jetter assembly, respectively.

FIGS. 7a-7c illustrate a perspective view of a supporting gusset, a side view of a supporting gusset and a distal-end view of a supporting gusset, respectively.

DETAILED DESCRIPTION OF THE INVENTION

Figure 1G:
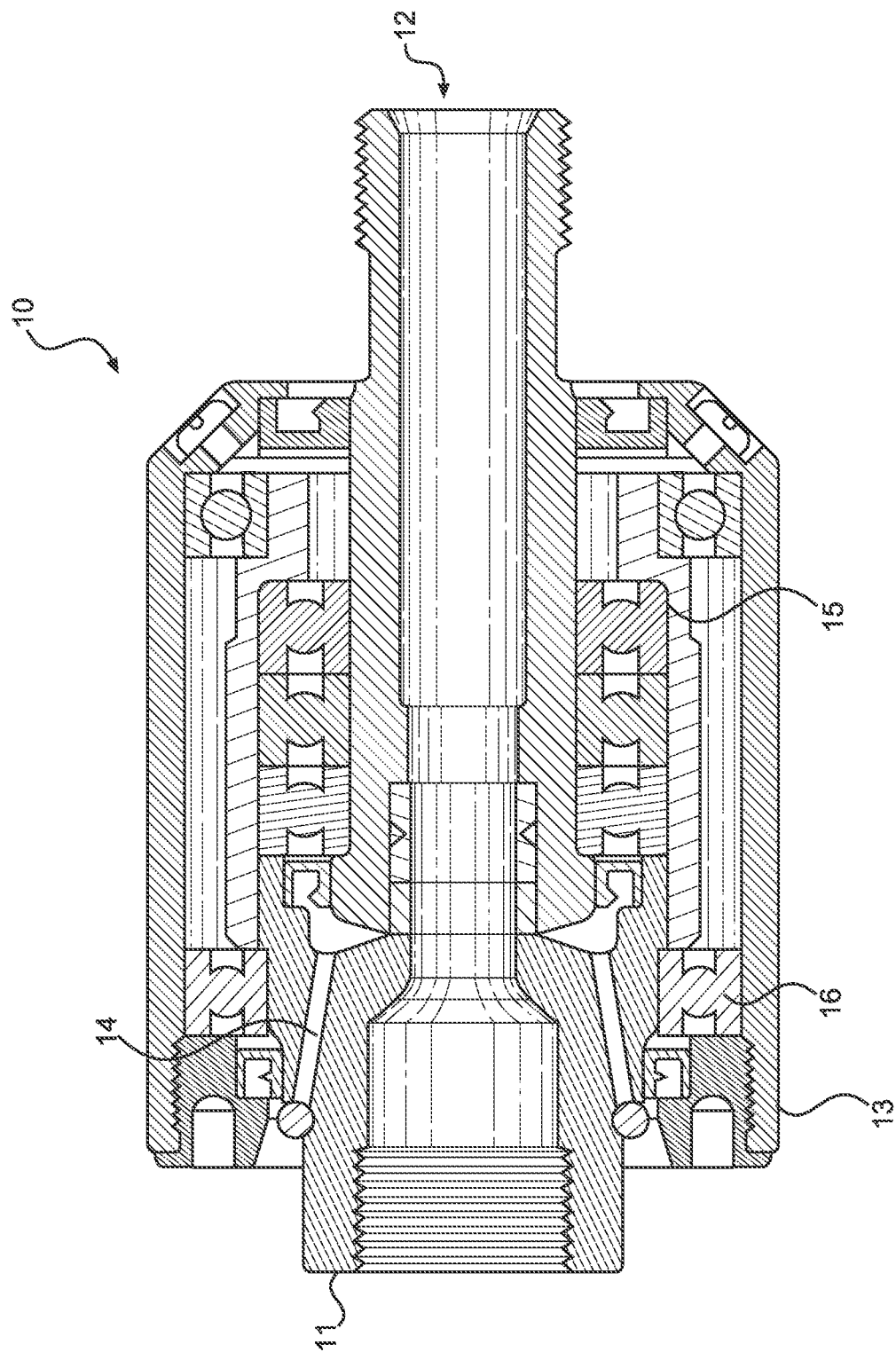

FIGS. 1a-1g illustrate perspective, first and second partial enlarged perspective, over, side and first and second partial cross-sectional views of an exemplary embodiment of a jetter assembly 100, respectively. As illustrated in FIG. 1a, jetter assembly 100 is composed of a high-pressure rotational union 10, an outer shroud assembly 30, and an inner washing ring assembly 60. Also visible in FIG. 1a is shroud aperture 40.

FIG. 1b illustrates in greater detail elements of high-pressure rotational union 10 as well as elements of outer shroud assembly 30, while FIG. 1c illustrates in greater detail elements of outer shroud assembly 30. As shown in FIG. 1b, high-pressure rotational union 10 is composed of hose inlet 11, shaft 12, outer body 13 and inner ring segments 17a-17e. Outer shroud assembly 30 includes supporting gussets 31a-31e, angular feet 32a-32e, threaded foot rods 33a-33e, inner shroud sandwich plates 34a-34e, outer shroud sandwich plates 35a-35e and shroud sections 36a-36e.

As shown in FIG. 1b, hose inlet 11 is located at the upper-most point of high-pressure rotational union 10. Hose inlet 11 has an approximately one-inch female thread for connecting to a source of pressurized fluid (not shown). In an exemplary embodiment, the source of pressurized fluid may be a high-pressure hose connected to a fluid pump. In an exemplary embodiment, the pressurized fluid may be fresh water or seawater. As further shown in FIG. 1b, shaft 12 is located below hose inlet 11 within high-pressure rotational union 10. Shaft 12 has an approximately one-inch male thread for connecting to other components. As further shown in FIG. 1b, outer body 13 surrounds at least part of hose inlet 11 and shaft 12.

As shown in FIG. 1b, inner ring segments 17a-17e attach to outer body 13 on high-pressure rotational union 10. Each of inner ring segments 17a-17e interconnects to one of supporting gussets 31a-31e using inner ring apertures 18a-18e. Inner ring apertures 18a-18e are threaded, angled apertures, each of which receives a threaded proximal end of one of supporting gussets 31a-31e. Each of inner ring segments 17a-17e interconnects to another of inner ring segments 17a-17e by means of inner ring connectors 19a-19e. Inner ring connectors 19a-19e may be screws, bolts, or other fasteners known in the art.

As shown in FIG. 1c, supporting gussets 31a-31e extend from inner ring segments 17a-17e to angular feet 32a-32e. Supporting gussets 31a-31e adjustably connect to angular feet 32a-32e by threaded rods 33a-33e integral to angular feet 32a-32e. Threaded rods 33a-33e have male threading which allows them to mate with female-threaded distal ends of supporting gussets 31a-31e. A user may adjust the distance between supporting gussets 31a-31e and angular feet 32a-32e by rotating supporting gussets 31a-31e relative to angular feet 32a-32e.

As further shown in FIGS. 1c and 1f, angular feet 32a-32e attach to inner shroud sandwich plates 34a-34e via screws, bolts, or other fasteners known in the art. Inner shroud sandwich plates 34a-34e connect the ends of shroud sections 36a-36e in conjunction with outer shroud sandwich plates 35a-35e. Shroud sections 36a-36e are placed end-to-end while inner shroud sandwich plates 34a-34e and outer shroud sandwich plates 35a-35e connect the ends. Inner shroud sandwich plates 34a-34e and outer shroud sandwich plates 35a-35e may be connected together using screws, bolts, or other fasteners known in the art to clamp shroud sections 36a-36e into place.

Shroud sections 36a-36e are approximately 8 inches in width and approximately 0.5 inches wide. In the exemplary embodiment, shroud sections 36a-36e are a polymer such as, but not limited to, high-density polyethylene or arena board. While the exemplary embodiment of outer shroud assembly 30 utilizes five shroud sections 36a-36e, with corresponding numbers of associated elements such as supporting gussets 31a-31e and angular feet 32a-32e, alternate embodiments may increase or decrease the number of shroud sections with a corresponding change in the numbers of associated elements.

FIG. 1e shows outer shroud sandwich plates 35a and 35e (remaining outer shroud sandwich plates 35b-35d not visible), as well as the 34-degree angle formed by shroud sections 36a-36e. While FIG. 1e only specifically shows the angle formed by shroud section 36d, the remaining unlabeled shroud sections 36a-36c and 36e form identical angles.

As shown in FIG. 1g, high-pressure rotational union 10 includes hose inlet 11, shaft 12, outer body 13, inlet pivot 14, shaft pivot 15 and outer body pivot 16. Inlet pivot 14 allows hose inlet 11 to rotate relative to and independently of shaft 12 and outer body 13. Shaft pivot 15 allows shaft 12 to rotate relative to and independently of hose inlet 11 and outer body 13. Outer body pivot 16 allows outer body 13 to rotate relative to and independently of hose inlet 11 and shaft 12.

Figure 2:
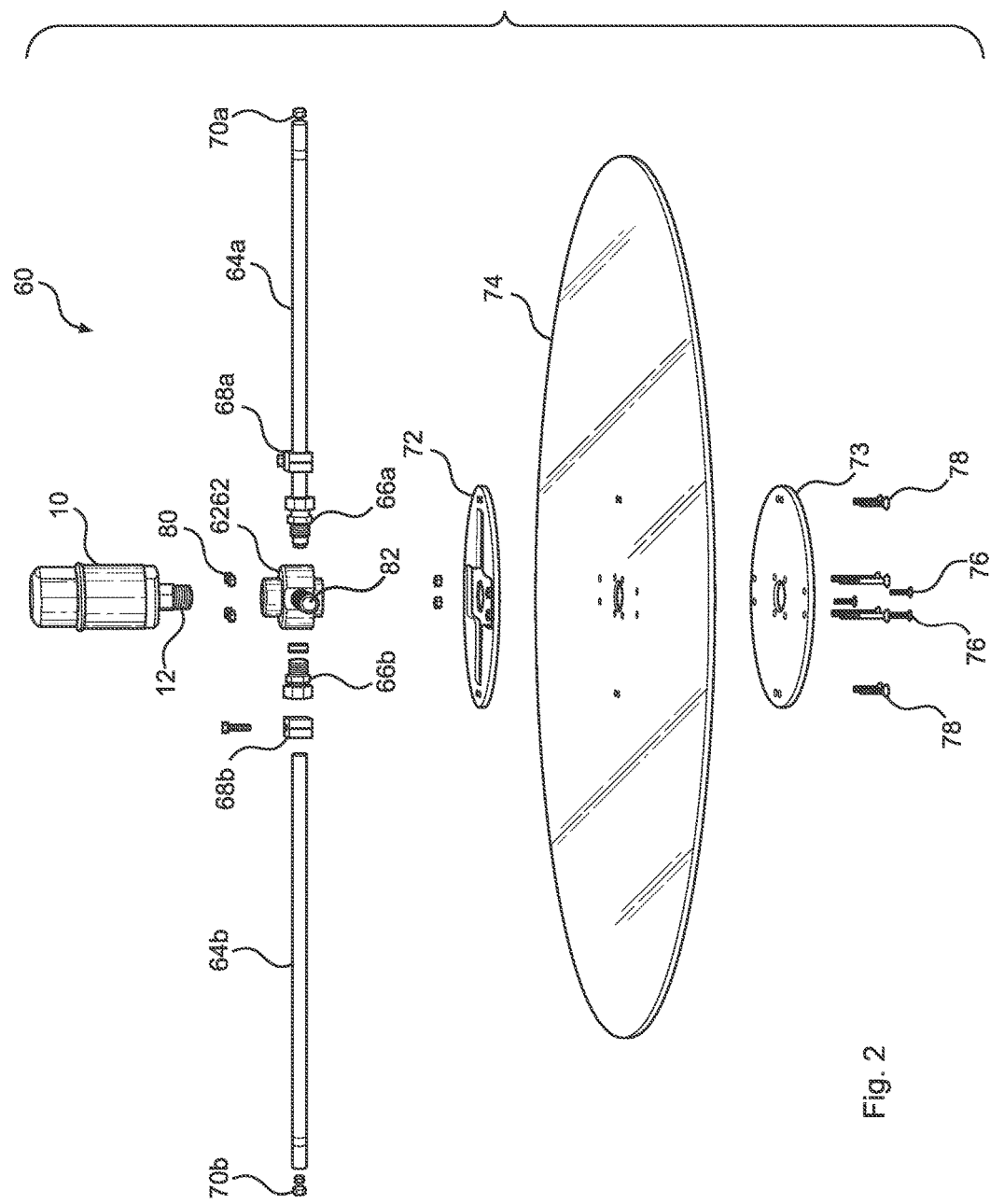
FIG. 2 illustrates an exploded view of an exemplary embodiment of an inner washing ring assembly of a jetter assembly.
Figure 3D:
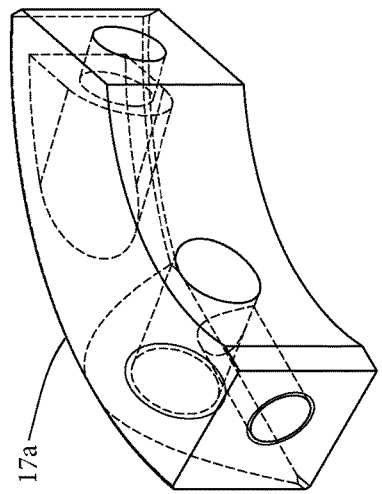
FIGS. 3a-3d illustrate an overview of assembled inner ring segments, inner ring apertures and inner ring connectors, a cross-sectional view of an inner ring segment and inner ring aperture, a front view of an inner ring segment and inner ring aperture and a back view of an inner ring segment and inner ring aperture, respectively.
Figure 3C:
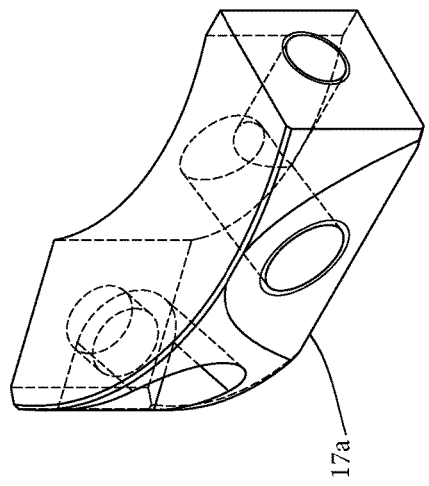
Figure 3B:
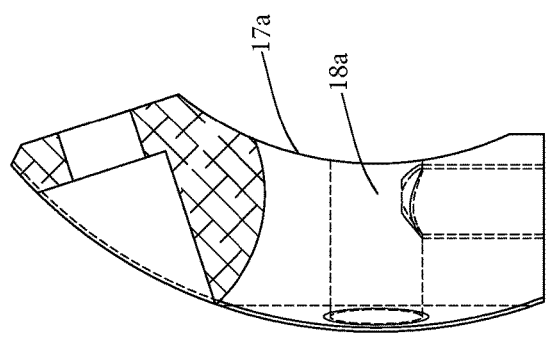
Figure 3A:
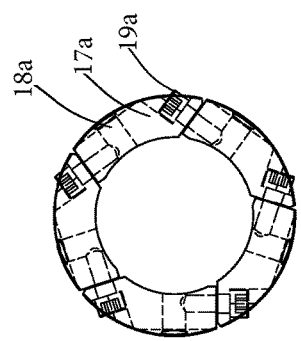
Figure 4B:
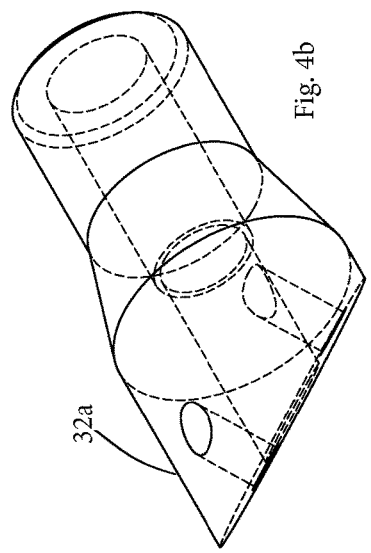
FIGS. 4a-4d illustrate a perspective view of an angular foot, a second perspective view of an angular foot, a side view of an angular foot and a bottom view of an angular foot, respectively.
Figure 4A:
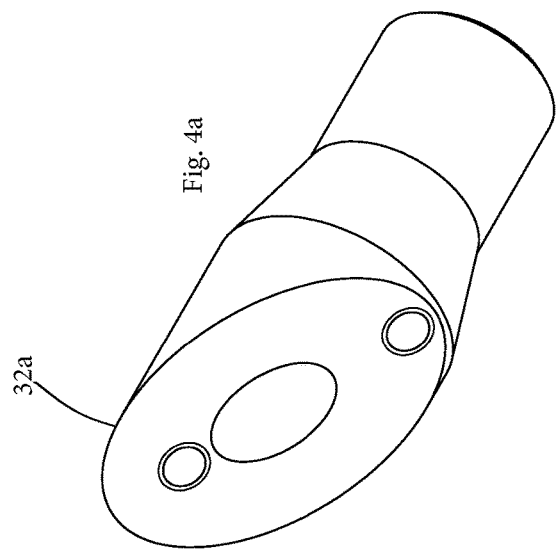
Figure 4C:
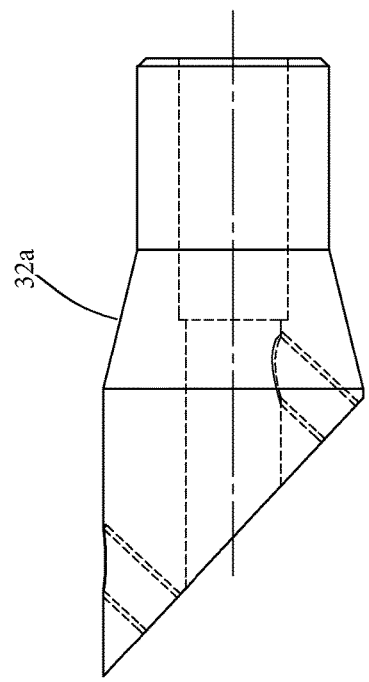
Figure 4D:
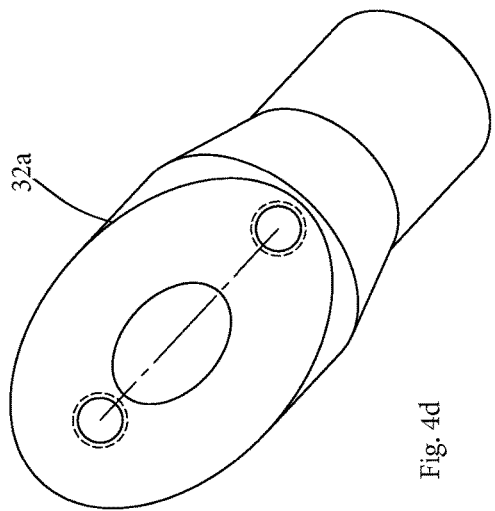

FIG. 2 illustrates an exploded view of an exemplary embodiment of an inner washing ring assembly 60 of a jetter assembly 100. Inner washing ring assembly 60 is composed of manifold 62, spray bars 64a and 64b, compression fittings 66a and 66b, arm clamps 68a and 68b, pressure washer nozzles 70a and 70b, upper vortex sandwich plate 72, lower vortex sandwich plate 73, centrifugal vortex plate 74, manifold bolts 76, plate bolts 78, washing locknuts 80 and optional port plug 82.

As shown in FIG. 2, manifold 62 attaches to shaft 12. This allows shaft 12 and inner washing ring assembly 60 to rotate when pressurized fluid is introduced through high-pressure rotational union 10. Compression fittings 66a and 66b connect manifold 62 to spray bars 64a and 64b. Compression fittings 66a and 66b swivel to allow spray bars 64a and 64b to adjust the angle they form with manifold 62. Locking jam nuts (not labeled) on the flare fittings (not labeled) of compression fittings 66a and 66b prevent the spray bars 64a and 64b from freely swiveling during use. During use, arm clamps 68a and 68b also prevent movement of spray bars 64a and 64b. At the distal ends of spray bars 64 and 64b, pressure washer nozzles 70a and 70b turn the flow of pressurized fluid into a pressure jet. The apertures of these pressure washer nozzles 70a and 70b are sized according to the capacity of the fluid pump and may be interchanged according to changing fluid pump capacity.

As further shown in FIG. 2, arm clamps 68a and 68b also connect to upper vortex sandwich plate 72, lower vortex sandwich plate 73 and centrifugal vortex plate 74 through plate bolts 78, providing additional stability to spray bars 64a and 64b.

As shown in FIG. 2, centrifugal vortex plate 74 is sandwiched between upper vortex sandwich plate 72 and lower vortex sandwich plate 73. Centrifugal vortex plate 74 is a machined polymer material such as Lexan™ polycarbonate. The spinning movement of centrifugal vortex plate 74 creates a fluid vortex replicating a typhoon that more effectively cleans nets. Furthermore, centrifugal vortex plate 74 prevents nets from snagging on spray bars 64a and 64b, thereby preventing damage to the nets.

As further shown in FIG. 2, centrifugal vortex plate 74 is sandwiched between upper vortex sandwich plate 72 and lower vortex sandwich plate 73 via manifold bolts 76 and plate bolts 78. Manifold bolts 76 also serve to connect upper vortex sandwich plate 72 and manifold 62. Nylon washing locknuts 80 hold manifold bolts 76 and plate bolts 78 in place.

Optionally, at least one port plug 82 may be used in the inner washing ring assembly 60 in place of at least one of spray bars 64a and 64b. A user can increase the power of the pressurized fluid delivered by inner washing ring assembly 60 by reducing the number of spray bars and increasing the aperture size of the remaining pressure washer nozzles 70a and 70b.

FIGS. 3a-3d illustrate an overview of assembled inner ring segments 17a-17e, inner ring apertures 18a-18e and inner ring connectors 19a-19e, a cross-sectional view of inner ring segment 17a and inner ring aperture 18a, a front view of inner ring segment 17a and inner ring aperture 18a and a back view of inner ring segment 17a and inner ring aperture 18a, respectively.

FIGS. 4a-4d illustrate a perspective view of an angular foot 32a, a second perspective view of an angular foot 32a, a side view of an angular foot 32a and a bottom view of an angular foot 32a, respectively.

Figure 5A:
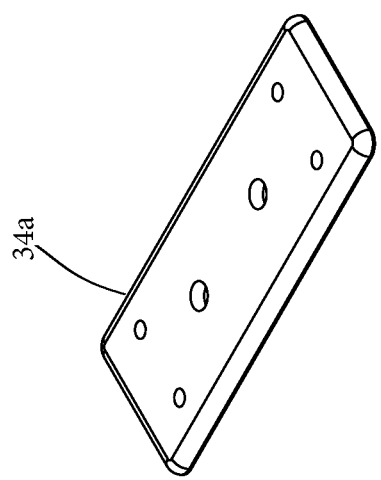
FIGS. 5a-5c illustrate a perspective view of an inner shroud sandwich plate, a top view of an inner shroud sandwich plate and a side view of an inner shroud sandwich plate, respectively.
Figure 5B:
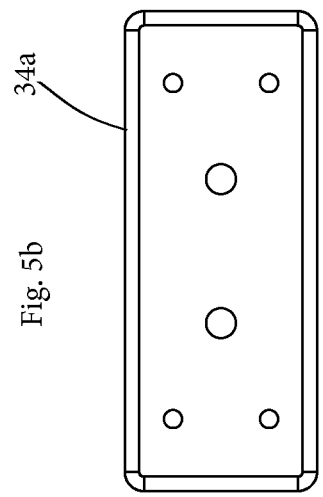
Figure 5C:

FIGS. 5a-5c illustrate a perspective view of an inner shroud sandwich plate 34a, a top view of an inner shroud sandwich plate 34a and a side view of an inner shroud sandwich plate 34a, respectively.

Figure 6A:
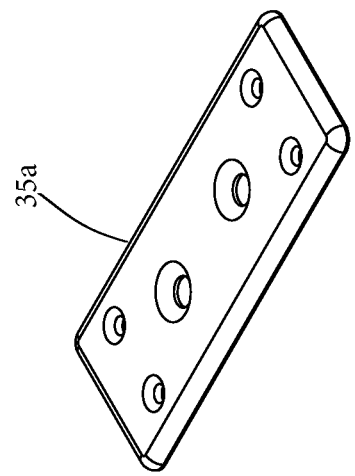
FIGS. 6a-6c illustrate a perspective view of an outer shroud sandwich plate, a top view of an outer shroud sandwich plate and a side view of an outer shroud sandwich plate, respectively.
Figure 6B:
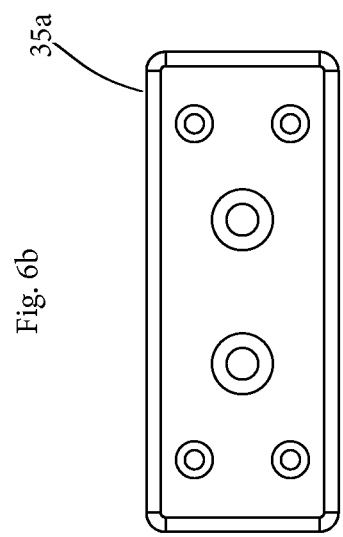
Figure 6C:
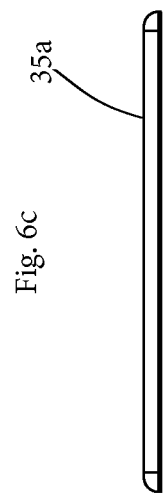

FIGS. 6a-6c illustrate a perspective view of an outer shroud sandwich plate 35a, a top view of an outer shroud sandwich plate 35a and a side view of an outer shroud sandwich plate 35a, respectively.

FIGS. 7a-7c illustrate a perspective view of a supporting gusset 31a, a side view of a supporting gusset 31a and a distal-end view of a supporting gusset 31a, respectively.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the term "approximately" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention. Furthermore, like reference numerals in the various drawings refer to identical or nearly identical structural elements. Not all identical or nearly identical structural elements are individually labelled.

What is claimed is:

1. An underwater net cleaning apparatus, comprised of:
   a manifold having an inlet end through which pressurized water enters, an outlet end, and a plurality of discharge apertures through which said pressurized water exits;
   a plate assembly which includes at least one plate fixedly attached at a point proximate to said outlet end, wherein said plate assembly has a plate assembly perimeter defined by the largest circumference of said at least one plate;
   a plurality of spray bars wherein each of said spray bars is comprised of a segment perpendicular to said manifold and a segment positioned at an angle to said manifold to form a bent spray bar;
      wherein each of said spray bars is fixedly attached to said manifold and operatively coupled with one of said discharge apertures, wherein said plurality of spray bars discharge water at an angle when pressurized water exits said discharge apertures to create a torque force, causing said manifold to rotate at a rotational speed and around a rotational axis, causing said plate assembly and said spray bars to rotate at substantially the same rotational speed and around substantially the same rotational axis as said manifold;
      wherein said plurality of said spray bars have a spray bar perimeter representing an area defined by the ends of said spray bars that are farthest from said manifold and wherein said spray bar perimeter is approximately equal to said plate assembly perimeter; and
   a deflection shroud which deflects water discharged from said spray bars to propel said underwater net cleaning apparatus without the use of propulsion jets or electrical power, wherein said deflection shroud is fixedly attached to a shroud frame and wherein said shroud frame rotates independently of said manifold.

2. The apparatus of claim 1, which further includes:
   a high-pressure rotational union comprised of a hose inlet connected to a fluid hose, a shaft, at least one outer body, a plurality of inner ring segments, an inlet pivot, a shaft pivot and an outer body pivot; and
   an outer shroud assembly comprised of said shroud frame and said deflection shroud, wherein said shroud frame is comprised of a plurality of supporting gussets coupled to said plurality of inner ring segments, said plurality of supporting gussets connected to said deflection shroud, wherein said deflection shroud is comprised of a plurality of inner shroud sandwich plates, a plurality of outer shroud sandwich plates and a plurality of shroud sections.

3. The apparatus of claim 2, wherein said inlet pivot, said shaft pivot and said outer body pivot are oriented to allow said hose inlet, said shaft and said outer body to pivot separately and independently of each other around a common axis.

4. The apparatus of claim 2, wherein said plurality of shroud sections form a frustoconical shape.

5. The apparatus of claim 2, wherein said plurality of spray bars is comprised of four spray bars.

6. The apparatus of claim 2, wherein each of said plurality of spray bars is further comprised of a pressure washer nozzle.

7. The apparatus of claim 6, wherein said pressure washer nozzle is removable and interchangeable.

8. The apparatus of claim 2, wherein said shroud frame is comprised of a plurality of supporting gussets which connect said deflection shroud to said rotational union.

9. The apparatus of claim 8, wherein said supporting gussets are attached at an angle of less than 90 degrees, relative to the axis of rotation of said manifold.

10. The apparatus of claim 9, wherein said supporting gussets are comprised of one or more segments selected from a group consisting of: angled segments, parallel segments, and curved segments.

11. The apparatus of claim 1, wherein said plate assembly is comprised of an upper plate, a lower plate, and a central plate.

12. The apparatus of claim 11, wherein said central plate has a central plate diameter that is larger than the diameters of said upper plate and said lower plate.

13. The apparatus of claim 12, wherein said central plate has a central plate radius approximately equal to the length of each of said plurality of spray bars.

14. The apparatus of claim 1, wherein said shroud frame includes a rotational union which rotationally attaches said shroud frame to said manifold.

15. The apparatus of claim 1, wherein said deflection shroud has a narrow portion located on substantially the same plane as said plate assembly, wherein said narrow portion has an inner perimeter defined by an aperture which is larger than said plate assembly perimeter.

16. The apparatus of claim 1, wherein the outer surface of said shroud frame forms an approximately 34-degree angle, relative to said plate assembly.

17. The apparatus of claim 1, wherein the locations of said plurality of discharge apertures on said manifold are symmetric around the axis of rotation of said manifold to position said spray bars to create a torque force in an underwater, high-pressure environment by providing balanced discharge of water in opposing directions.

* * * * *